Feb. 6, 1923.
F. W. PARSONS.
TURRET LATHE.
FILED JULY 14, 1919.
1,443,965
5 SHEETS-SHEET 2
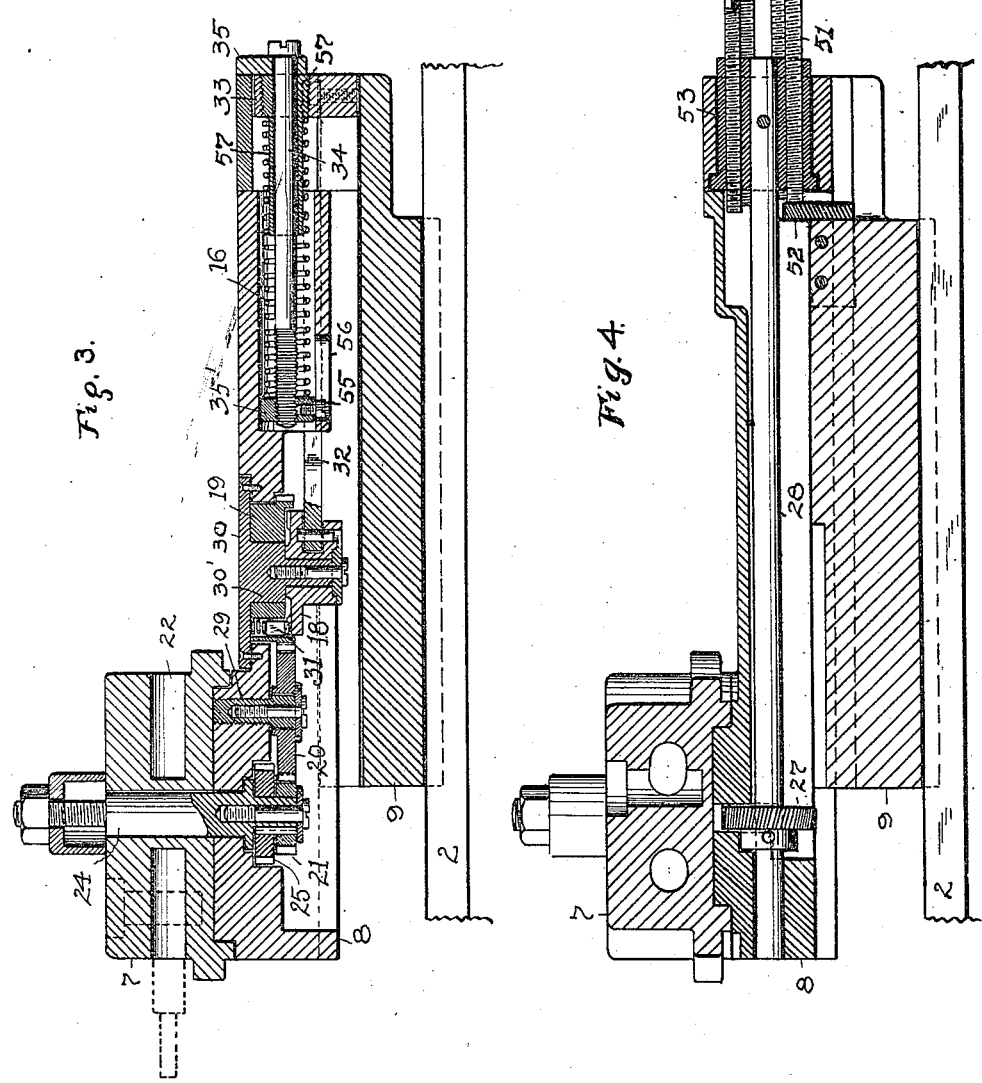
Inventor
F. W. PARSONS.
By Fisher &co.
Attorneys

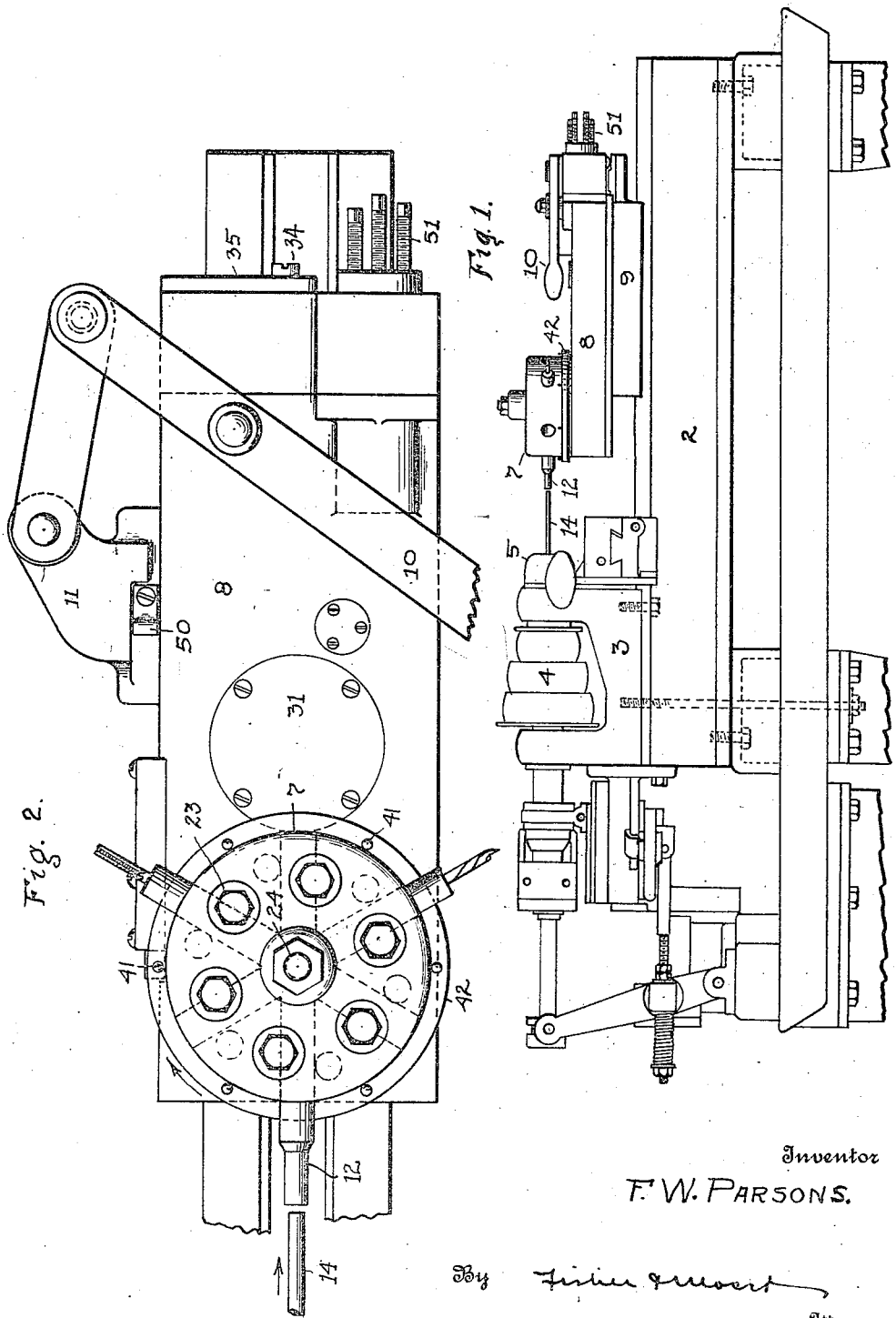

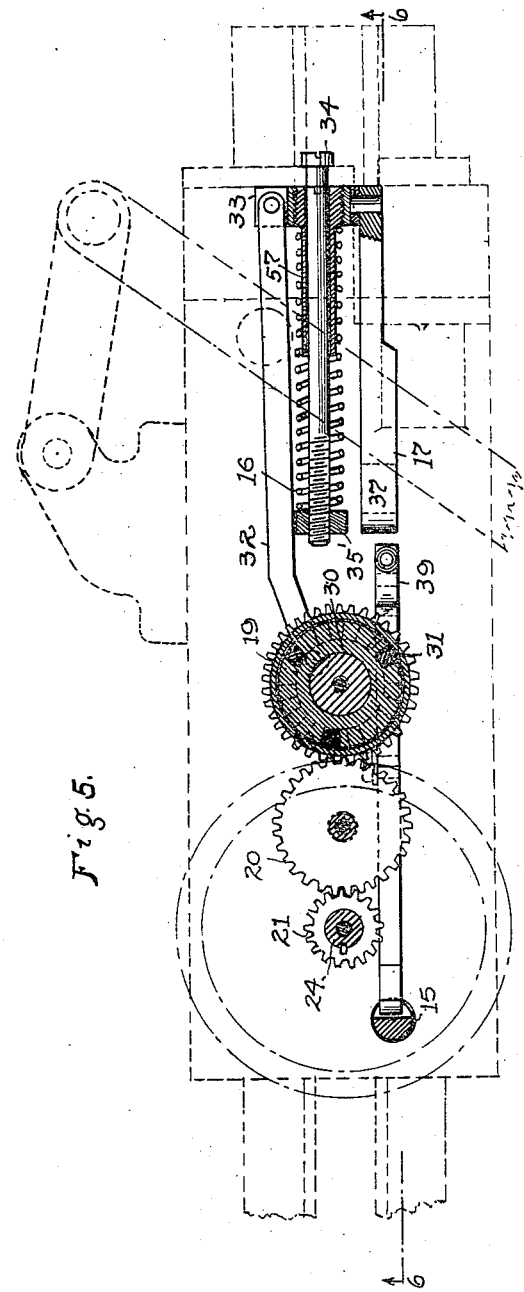
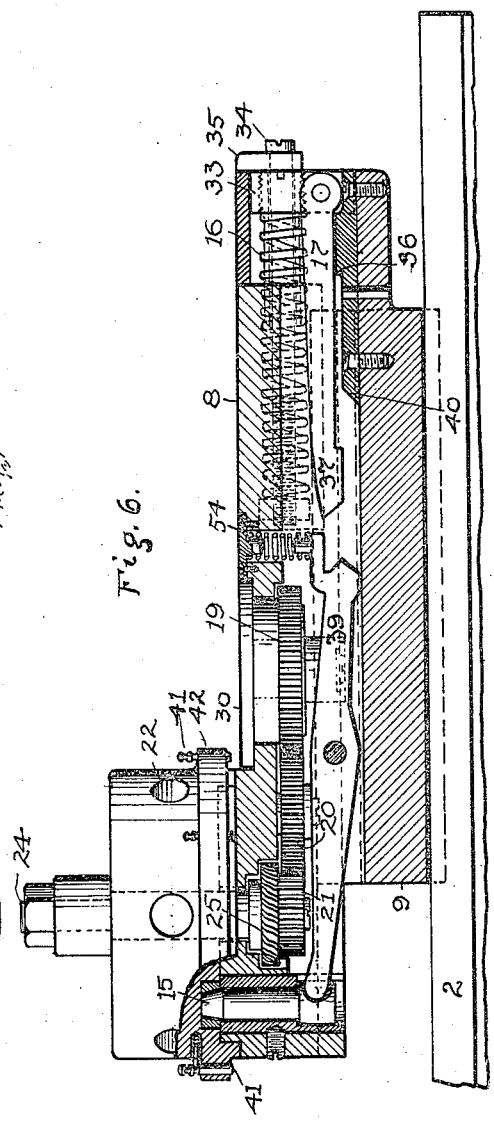

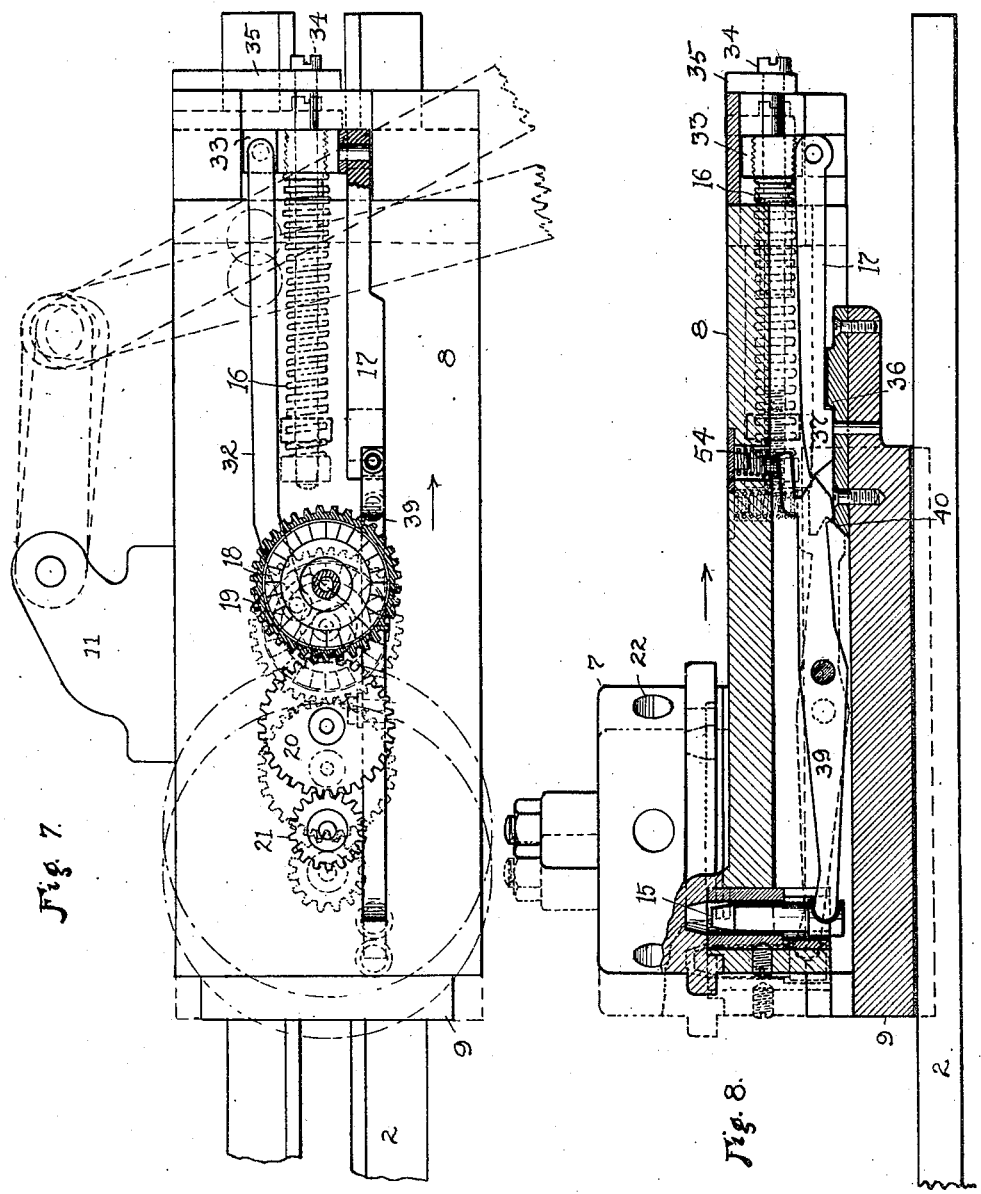

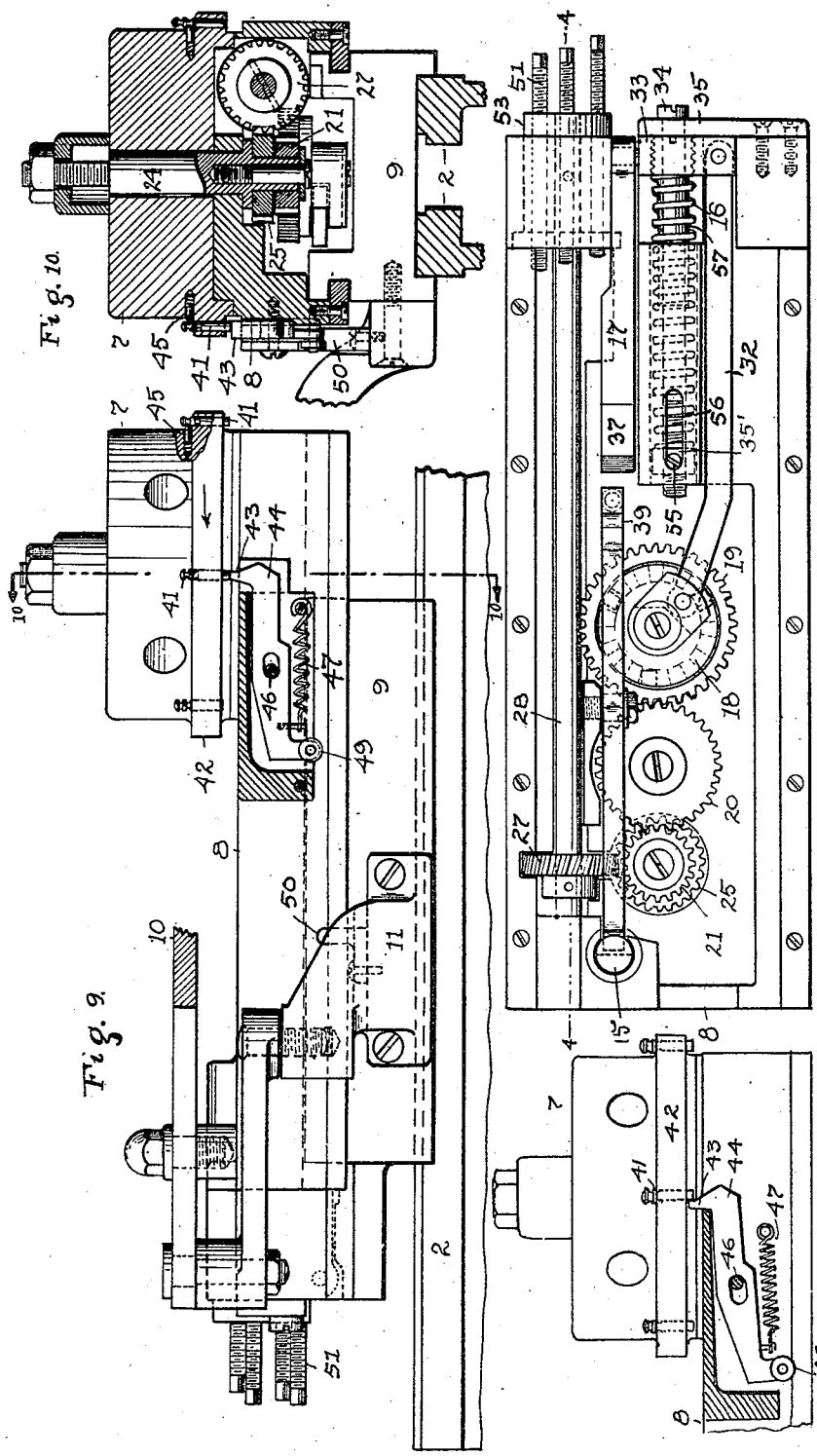

Patented Feb. 6, 1923.

1,443,965

UNITED STATES PATENT OFFICE.

FREDERICK W. PARSONS, OF CLEVELAND, OHIO.

TURRET LATHE.

Application filed July 14, 1919. Serial No. 310,671.

*To all whom it may concern:*

Be it known that FREDERICK W. PARSONS, citizen of the United States, residing at Cleveland, in the county of Cuyahoga and State of Ohio, has invented certain new and useful Improvements in Turret Lathes, of which the following is a specification.

This invention relates more particularly to an improvement in turret lathes, and the general object of the invention is to provide an organization of parts adapted to expedite and cheapen the production of lathe work by simplifying the operations and eliminating all unnecessary movements on the part of the operator.

The conception involves the use of a reciprocal slide upon which a turret is adapted to be automatically rotated, either partly or completely, by merely reciprocating the slide away from and toward the work. Simple adjustable means are also provided to determine the degree of rotation of the turret, the extent of movement of the slide for each tool in the turret, and the force to be stored and supplied to rotate the turret a predetermined degree.

In the drawings accompanying this application, Fig. 1 is a side view of a lathe embodying my improvement, and Fig. 2 is an enlarged top view of the slide and turret constructed according to my invention. Fig. 3 is a longitudinal vertical section on the center line of the saddle slide and turret, and Fig. 4 is a longitudinal vertical section on line 4—4, Fig. 11 showing the adjustable stop devices for limiting the movement of the slide and turret toward the work. Fig. 5 is a top plan and sectional view of the turret operating mechanism, the outlines of the saddle, slide and turret being shown in dotted lines. Fig. 6 is a longitudinal vertical section of the saddle, slide and a portion of the turret, approximately on line 6—6, Fig. 5. Fig. 7 is a plan view of the gears and parts which rotate the turret, the full and dotted lines indicating different working positions and the degree of moment required to compress the spring for rotating the turret. Fig. 8 is a view corresponding to Fig. 6 but with the slide and parts carried thereby in a different position on the saddle and with the turret bolt withdrawn and the compressing device for the spring about to be released. Fig. 9 is a side elevation and part sectional view of the turret stop mechanism, and Fig. 10 is a cross section on line 10—10, Fig. 9.

Fig. 11 is a bottom or inverted view of the slide and parts therein. Fig. 12 is a side view of the turret and stop pins.

The invention may be incorporated in any lathe wherein a turret is employed, and Fig. 1 illustrates the application of the invention to a lathe having shears or a bed 2 carrying a headstock 3 which embodies a cone pulley 4 and a chuck 5 through which the stock or work is fed toward and against a stop or tool in a rotatable turret 7 which is mounted upon a slide 8 and a saddle 9 carried by bed 2.

The slide 8 and turret are adapted to be moved back and forth together relatively to the headstock 3 by a hand lever 10 which is linked to a bracket 11 attached to saddle 9. The operator stands opposite the turret and a draw movement on the lever brings the slide and turret forward to a predetermined stopping point on the saddle according to the tool to be used on the work. Generally the turret holds a stop member 12 as well as drills, taps or other tools, and this stop member is adapted to be stationed opposite the work, represented in Fig. 2 by a rod 14. After this rod has been fed against the end of stop member 12 and is at rest the operator merely presses lever 10 to the right which moves the slide and turret together away from the rod. During this retiring movement of the slide a tapered locking bolt 15 is withdrawn from engagement with the bottom of the turret, a heavy coiled spring 16 is compressed to store up power to rotate the turret, and a check pawl 17 is released to permit the compressed spring to rotate the turret through the medium of a ratchet member 18 and a set of spur gears 19, 20 and 21, see Figs. 3, 5, 7 and 8.

Turret 7 is provided with a series of sockets 22 radially therein for the tools and clamping bolts 23 extend downwardly from the top of the turret to secure the tools in the sockets, and the turret is sleeved over and clamped or keyed to a short vertical shaft 24 rotatably mounted in a bearing in the upper side of slide 8. The lower reduced end of shaft 24 carries a spiral gear 25 and the small gear or pinion 21, the spiral gear meshing with a second spiral gear 27 on a longitudinal shaft 28 at one side and within slide 8. Pinion 21 meshes with a larger spur gear 20 suspended within the slide on a screw shaft 29, and rotation of gear 20 is through and by gear 19 which is supported upon the depending stud 30' of a circular plate 30 set within the top of slide 8. Gear 19 is provided with one or more pockets or openings within which a dog or set of dogs 31 are free to slide vertically under the pressure of coiled springs so as to maintain ratchet engagement between gear 19 and the radial teeth at the top side of the oscillatory ratchet member 18 immediately beneath gear 19. When slide 8 is retired this gear 19 is stationary, that is, it does not rotate, but ratchet member 18 turns on the stud with an idle movement of dog 31 during part of this retiring movement of the slide so that the dog or dogs will take hold on a new tooth or set of teeth on ratchet member 18. To bring this result about a link 32 connects ratchet member 18 with a small cross-head 33 which is sleeved to slide on an adjusting screw 34 having rotatable bearing at its outer end in an end plate 35 affixed to or forming part of slide 8, and the coiled spring 16 is also sleeved on screw 34 and interposed between cross-head 33 and a nut 35' at the inner end of the screw. Thus, when the slide retires it carries the gears, link and cross-head with it, together with pawl 17 which is pivotally connected to the cross-head and adapted to trail its free hook-shaped end over the top side of saddle 9 until a vertical shoulder 36 on a stop piece affixed to the saddle is engaged by the hook 37, see Figs. 5 to 8, inclusive. The movement of cross-head 33 is arrested as soon as hook 37 engages shoulder 36 but slide 8 moves on to the right and by so doing the spring 16 is compressed because the adjusting screw and its nut 35' is also carried onward with the slide, and in this interval of movement stud 30 carries ratchet member 18 with the slide while link 32 is arrested or at a standstill thereby giving said ratchet member a partial turn without rotating gear 19. In brief, the spring is now compressed and the ratchet mechanism set to turn the gears and turret the instant hook 37 is released from shoulder 36. Such release is effected when the beveled end of a trip lever 39 engages the beveled end of hook 37, see Fig. 8, and this trip lever also functions to lock and unlock the turret. Thus at the beginning of the retiring movement of slide 8 the turret is locked by bolt 15 at the front end of slide 8, see Fig. 6, and then unlocked when the beveled end of pivoted lever 39 is forced upward by engagement with the sloping end 40 of the stop piece on saddle 9, thus lowering the front end of the lever and bolt 15 which has a socket or pivotal connection therewith, see Fig. 8.

The travel of the slide is relatively short in compressing the spring and in releasing hook 37 of pawl 17 to permit the spring to act, and only a partial rotation is given to ratchet member 18 by link 32 under the impulse of the spring when release of pawl 17 is effected. On the other hand the turret is adapted to be rotated a full turn or more by the small pinion 21 which is driven by the larger gears 19 and 20, although in practice the turret is usually only rotated partially, that is, step by step to bring the different tools in the turret successively opposite the work and with the turret always rotating in the same direction.

The stopping of the turret to align any given tool or set of tools successively with the work is a matter of election on the part of the operator prior to or during operations. That is, the operator may select and depress one or more stop pins 41 in the rim 42 of the turret so that the lower end of each depressed pin will come successively into contact with the raised projection 43 of a latch 44 which is pivoted upon one side of slide 8, see Figs. 9 and 10. The upper end of each pin 41 is grooved annularly in two places to seat a spring-pressed detent 45 housed within the side of the turret, and each pin may be raised or lowered and thereafter held in either position by the detent.

At the beginning of the rotation of the turret the pin 41 rests upon the upper side of the latch projection 43 as shown in Fig. 9 to permit the turret to be rotated, and this relationship of parts is established after each rotatable movement of the turret. Briefly, the latch must act to engage the pin to stop the turret and then drop beneath the pin. To achieve that result latch 44 is mounted to slide upon its pivot pin 46 within the limits of a short slot, and a tension spring 47 carries the latch forward and tilts it also to place its projection 43 in the path of a turret pin 41 as soon as the turret begins to revolve. Then when the pin strikes the projection the latch is forced back the length of its pivot slot and the parts remain in this position until a depending roller 49 on the latch engages a stationary member 50 on bracket 11, thereby tilting and freeing the latch from the pin and permitting spring 47 to draw the latch forward and placing its projection 43 underneath the pin.

Depression of one turret stop pin 41 will limit the rotation of the turret to one complete turn, and depression of two stop pins diametrically opposite each other will limit the turret to successive turning movements of one-hundred and eighty degrees. Each tool in the turret has a corresponding stop pin and any tool or succession of tools may be halted opposite the work by depressing the proper pins beforehand and the turret may be permitted to rotate either uniform or different distances successively.

The work rotates in the fixed position as predetermined, and slide 8 and the various tools in the turret are advanced successively in varying degree in respect to the work according to predetermined requirements and each tool in the turret is positively stopped at a predetermined point during its feed or forward movement toward the head stock. This result is accomplished by rotating a series of adjustable stop screws —51— in a circle opposite a stop-plate —52— on saddle 9 coincidently and in the same degree as the turret. Thus the stop screws 51 correspond in number and radial position to the number of or places for tools in the turret and all the stop screws are mounted in and extend through a cylinder 53 which is carried within and by slide 8 and driven by the longitudinal shaft 28 and the spiral gears 25 and 27. The outer wrench-engaging ends of the stop screws are exposed at the rear end of the slide and each stop screw may be separately adjusted and set to limit the forward travel of the slide and the turret and thereby the distance of travel of the tool within or over the work.

The head of adjusting screw 34 is also exposed at the outer end of the slide, and spring 16 may be given any desired tension by rotating screw 34. The change in tension is brought about by the travel of nut 35′ on the screw 34 and the nut is prevented from rotating by a short screw or pin 55 sliding in a slot 56, see Figs. 3 and 11. One end of the spring 16 is also sleeved over a tubular screw 57 which is removably mounted on cross head 33 so that repairs and replacement of a broken or weak spring can be easily accomplished without dismantling or removing the slide from the saddle.

In operation, each movement of the slide away from the work will first cause the locking bolt to be withdrawn from the turret, then hook 37 engages shoulder 36 and spring 16 is compressed and the ratchet member 18 rotated to an effective operating position. Trip lever 39 then releases hook 37 and the spring expands and rotates the gears and turret and the stop screw cylinder 53 is also rotated. The degree of rotation of both said turret and cylinder is dependent upon the particular turret stop pin 41 which has been depressed or lowered in advance to engage latch 44, but the instant a stop-pin is engaged the latch is pressed back a short distance and then the turret is brought to a rest position with the desired tool opposite the work and with a stop screw 51 corresponding to that tool in line with stop plate 52. The movement of hand lever 10 is now reversed and slide 8 moved forwardly as far as the stop screw 51 will permit and in the initial stages of this movement the turret locking bolt 15 is raised into one of the series of bolt openings in the bottom side of the turret to lock the turret and align the working tool opposite the work.

Uplift of bolt 15 is caused by a spring 54 which bears down upon the beveled end of trip lever 39 and the action occurs as soon as the beveled end of the lever rides free from the sloping portion 40 of the stop piece on saddle 9, see Fig. 8. The next part actuated in the forward movement of slide 8 toward the work is latch 44 which is tilted when its depending roller 49 engages the stationary member 50 whereupon spring 47 draws the latch forward underneath the stop pin on the turret thereby releasing the turret for further rotation and permitting a repetition of operations at the election of the operator.

What I claim is:

1. In a lathe, a slide and a tool holding turret, ratchet gear mechanism adapted to rotate said turret in variable degree, adjustable stops adapted to limit the degree of rotation of said turret, and a spring adapted to operate said gear mechanism.

2. In a lathe, a saddle and a reciprocable slide thereon and a tool-holding turret, pinion and ratchet gearing adapted to rotate said turret invariable degree, radially spaced stop members adapted to limit the degree of rotation of said turret, and means operable by the movement of said slide adapted to rotate said gearing.

3. In a lathe, a slide and lever adapted to reciprocate the same, a tool-holding turret mounted upon said slide, a series of stop pins for said turret, gears and a ratchet member and a spring adapted to rotate said turret in variable degree and means adapted to set said spring for action during the reciprocal movement of said slide.

4. In a lathe, a reciprocable slide with a tool-holding turret mounted thereon, stop pins radially of said turret adapted to fix the degree of rotation of said turret, and compressible spring means operable by the movement of said slide having pinion and gear mechanism adapted to rotate said turret in variable degree.

5. In a lathe, a reciprocable slide, a rotatable tool-holding turret mounted on said slide, adjustable stop means adapted to limit the degree of rotation of said turret, ratchet and pinion gearing and a compressible spring adapted to rotate said turret invariable degree, and means adapted to compress said spring by a movement imparted to said slide.

6. In a lathe, a reciprocable slide, a tool-holding turret supported upon said slide, ratchet gear mechanism adapted to rotate said turret, a power spring having operative connection with said mechanism, a check member adapted to store up energy in said spring during a reciprocable movement of said slide, and means adapted to release said check member to effect rotation of said turret by said spring and ratchet mechanism.

7. In a lathe, a reciprocable slide, a rotatable turret mounted on said slide, a compressible spring and ratchet and gear means adapted to rotate said turret during reciprocable movements of said slide, a pinion gear to augment the rotative movement of said turret, and adjustable stop means in operable connection with said turret adapted to limit the movement of said slide.

8. In a lathe, a rotatable turret, a set of adjustable stop members parallel to the axis of said turret, means adapted to rotate said turret, and a latch adapted to co-act with said members in limiting the rotation of the turret.

9. In a lathe, a rotatable turret having stops adapted to be set in different positions, and a pivoted latch adapted to engage selected stops successively to limit the rotation of the turret.

10. In a lathe, a rotatable turret, depressible stop pins carried by said turret, and a latch adapted to engage selected pins and to effect self-release therefrom.

11. In a lathe, a reciprocable slide and a rotatable turret thereon, a set of stop members carried by said turret, a latch adapted to engage said stop members successively, and means adapted to effect release of said latch from said stop members upon movement of said slide.

12. In a lathe, a turret having a set of stop pins, a slide for said turret, a movable latch mounted on said slide adapted to be engaged by said pins, and a stationary device adapted to actuate said latch and effect release thereof from an engaged pin.

13. In a lathe, a turret having a set of selective stop pins radially thereon, a reciprocable slide carrying said turret, a tilting spring-controlled latch adapted to engage selected pins, and a saddle supporting said slide having means thereon adapted to tilt said latch upon a reciprocal movement of said slide.

14. In a lathe, a turret, means adapted to rotate said turret intermittently, a set of selective stop members for said turret, a latch adapted to be engaged by said stop members successively, a slide carrying said turret and latch, and means adapted to disengage said latch from said stop members successively during reciprocal movements of said slide.

15. In a lathe, a slide and a turret thereon, and means adapted to rotate said turret by the movement of said slide, comprising gears and ratchet means, a spring, a slidable cross head connected with said ratchet means, a check member for said cross head, and means adapted to release said check member.

16. In a lathe, a slide and a turret thereon, and mechanism adapted to revolve said turret at intervals by the movement of the slide, comprising a spring and means for adjustably changing the tension of said spring.

17. In a lathe, a movable slide and a rotatable turret thereon, and mechanism adapted to rotate said turret intermittently by the movement of the slide comprising a spring, and an adjusting bolt and nut and a compression member for the spring.

18. In a lathe, a slide and a turret thereon, and means adapted to rotate said turret by the movement of the slide, comprising a spring, an adjusting screw for changing the tension of the spring, and a removable and replaceable backing member for the spring sleeved upon said screw.

Signed at Cleveland, in the county of Cuyahoga, and State of Ohio, this 25th day of June, 1919.

FREDERICK W. PARSONS.